US009780716B2

United States Patent
El-Refaie et al.

(10) Patent No.: US 9,780,716 B2
(45) Date of Patent: Oct. 3, 2017

(54) HIGH POWER-DENSITY, HIGH BACK EMF PERMANENT MAGNET MACHINE AND METHOD OF MAKING SAME

(75) Inventors: Ayman Mohamed Fawzi El-Refaie, Niskayuna, NY (US); Robert Dean King, Schenectady, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 1268 days.

(21) Appl. No.: 12/949,925

(22) Filed: Nov. 19, 2010

(65) Prior Publication Data

US 2012/0126733 A1    May 24, 2012

(51) Int. Cl.
　　H02P 27/04　　(2016.01)
　　H02P 27/08　　(2006.01)
　　H02P 25/024　　(2016.01)

(52) U.S. Cl.
　　CPC .......... H02P 27/08 (2013.01); H02P 25/024 (2016.02); *Y10T 29/49002* (2015.01)

(58) Field of Classification Search
　　CPC ............ H02P 27/08; Y10T 29/49002; H01L 2924/0002; H01L 2924/00; H01L 25/071; H01L 25/18; H01L 2924/12044; G01R 31/2887; H02M 7/003
　　USPC ............ 318/800, 801, 139, 145, 459, 461, 318/400.26, 400.34; 180/65.275; 322/16
　　See application file for complete search history.

(56) References Cited

U.S. PATENT DOCUMENTS

| | | | |
|---|---|---|---|
| 5,041,896 A | 8/1991 | Temple et al. | |
| 5,385,855 A * | 1/1995 | Brown | H01L 21/7602 148/DIG. 148 |
| 5,510,281 A | 4/1996 | Ghezzo et al. | |
| 5,510,632 A | 4/1996 | Brown et al. | |
| 5,514,604 A | 5/1996 | Brown | |
| 5,543,703 A * | 8/1996 | Kusase | H01L 29/7803 180/65.245 |
| 5,672,889 A | 9/1997 | Brown | |
| 5,719,484 A * | 2/1998 | Taniguchi | H02J 7/1438 322/20 |

(Continued)

FOREIGN PATENT DOCUMENTS

| | | |
|---|---|---|
| CN | 1115130 A | 1/1996 |
| CN | 101197546 A | 6/2008 |

(Continued)

OTHER PUBLICATIONS

Matocha, "Challenges in SiC Power MOSFET Design," ISDRS 2007, Dec. 12-14, 2007, College Park, MD, pp. 1-2, http://www.ece.umd.edu/ISDRS.

(Continued)

*Primary Examiner* — Rita Leykin
(74) *Attorney, Agent, or Firm* — Meagher Emanuel Laks Goldberg & Liao, LLP

(57) ABSTRACT

An electric drive system includes a permanent magnet machine having a rotor and a stator and a power converter electrically coupled to the permanent magnet machine and configured to convert a DC link voltage to an AC output voltage to drive the permanent magnet machine. The power converter includes a plurality of silicon carbide switching devices having a voltage rating that exceeds a peak line-to-line back electromotive force of the permanent magnet machine at a maximum speed of the permanent magnet machine.

24 Claims, 2 Drawing Sheets

(56) References Cited

U.S. PATENT DOCUMENTS

| | | | |
|---|---|---|---|
| 5,726,463 A * | 3/1998 | Brown | H01L 29/1608 257/288 |
| 5,731,689 A * | 3/1998 | Sato | H02J 7/1446 322/20 |
| 5,757,151 A * | 5/1998 | Donegan | B60K 6/30 180/65.245 |
| 5,814,859 A | 9/1998 | Ghezzo et al. | |
| 5,963,791 A * | 10/1999 | Brown | H01L 29/1608 257/E21.066 |
| 6,198,183 B1 | 3/2001 | Baeumel et al. | |
| 6,239,582 B1 | 5/2001 | Buzan et al. | |
| 6,498,451 B1 | 12/2002 | Boules et al. | |
| 6,690,592 B2 * | 2/2004 | Link | 363/98 |
| 6,843,335 B2 | 1/2005 | Shirakawa et al. | |
| 6,997,687 B2 | 2/2006 | Iritani | |
| 7,009,318 B2 | 3/2006 | Iritani et al. | |
| 7,038,260 B1 | 5/2006 | Yu | |
| 7,193,378 B1 * | 3/2007 | Welchko | H02P 6/085 318/400.27 |
| 7,210,304 B2 | 5/2007 | Nagashima | |
| 7,218,021 B2 | 5/2007 | Nilson | |
| 7,351,637 B2 | 4/2008 | Tucker | |
| 7,414,339 B2 * | 8/2008 | Kitamura | H02K 9/06 310/58 |
| 7,468,565 B2 | 12/2008 | Hoshiba | |
| 7,517,807 B1 | 4/2009 | Tucker et al. | |
| 7,521,732 B2 | 4/2009 | Matocha et al. | |
| 7,554,220 B2 * | 6/2009 | Sugawara | H01M 10/42 307/64 |
| 7,652,858 B2 | 1/2010 | Tang et al. | |
| 7,679,941 B2 * | 3/2010 | Raju | H02M 7/217 363/37 |
| 7,690,456 B2 * | 4/2010 | Deng | B60K 6/26 180/65.265 |
| 7,787,270 B2 * | 8/2010 | NadimpalliRaju | H02J 4/00 363/37 |
| 8,027,181 B2 | 9/2011 | Hamatani | |
| 8,074,753 B2 * | 12/2011 | Tahara et al. | 180/65.21 |
| 8,083,557 B2 * | 12/2011 | Sullivan | 440/6 |
| 8,102,687 B2 * | 1/2012 | Takasu | H02M 3/1582 363/132 |
| 8,148,859 B2 | 4/2012 | Yoshida et al. | |
| 8,193,756 B2 * | 6/2012 | Jadric et al. | 318/716 |
| 8,363,440 B2 * | 1/2013 | Tagome | H02M 1/28 318/139 |
| 8,405,341 B2 * | 3/2013 | Tagome | H02K 3/28 318/254.1 |
| 2004/0119292 A1 | 6/2004 | Datta et al. | |
| 2005/0127396 A1 | 6/2005 | Mitra et al. | |
| 2006/0047358 A1 | 3/2006 | Liang et al. | |
| 2006/0086981 A1 | 4/2006 | Yamaguchi et al. | |
| 2006/0152085 A1 | 7/2006 | Flett et al. | |
| 2006/0267021 A1 | 11/2006 | Rowland et al. | |
| 2007/0015373 A1 | 1/2007 | Cowen et al. | |
| 2007/0120208 A1 | 5/2007 | Mitra | |
| 2007/0126007 A1 | 6/2007 | Matocha | |
| 2007/0151272 A1 * | 7/2007 | Cosan et al. | 62/228.1 |
| 2007/0224784 A1 | 9/2007 | Soloviev et al. | |
| 2007/0238253 A1 | 10/2007 | Tucker | |
| 2008/0014693 A1 | 1/2008 | Matocha | |
| 2008/0018289 A1 | 1/2008 | Tajima et al. | |
| 2008/0038890 A1 | 2/2008 | Tucker | |
| 2008/0050876 A1 | 2/2008 | Matocha et al. | |
| 2008/0108190 A1 | 5/2008 | Matocha | |
| 2008/0132047 A1 | 6/2008 | Dunne et al. | |
| 2008/0142811 A1 | 6/2008 | Matocha et al. | |
| 2008/0143183 A1 | 6/2008 | Hoshiba | |
| 2008/0146004 A1 | 6/2008 | Matocha et al. | |
| 2008/0238520 A1 | 10/2008 | de Rooij et al. | |
| 2009/0084472 A1 | 4/2009 | Gigliotti, Jr. et al. | |
| 2009/0117722 A1 | 5/2009 | Tucker et al. | |
| 2009/0159896 A1 | 6/2009 | Arthur et al. | |
| 2009/0194772 A1 | 8/2009 | Stum et al. | |
| 2009/0242292 A1 * | 10/2009 | Heller | B60L 11/14 180/65.275 |
| 2009/0279337 A1 | 11/2009 | Hamatani | |
| 2009/0289583 A1 | 11/2009 | Yoshida | |
| 2009/0322165 A1 * | 12/2009 | Rittenhouse | H02K 1/2786 310/43 |
| 2010/0050676 A1 | 3/2010 | Takamatsu et al. | |
| 2010/0090227 A1 | 4/2010 | Lou et al. | |
| 2010/0093116 A1 | 4/2010 | Fronheiser et al. | |
| 2010/0200931 A1 | 8/2010 | Matocha et al. | |
| 2012/0119573 A1 * | 5/2012 | Turudic | B60L 7/14 307/10.1 |

FOREIGN PATENT DOCUMENTS

| | | |
|---|---|---|
| CN | 101331673 A | 12/2008 |
| CN | 101496261 A | 7/2009 |
| DE | 102005032971 A1 | 1/2007 |
| EP | 0751601 A2 | 1/1997 |
| EP | 1947756 A1 | 7/2008 |
| EP | 2149469 A1 | 2/2010 |
| GB | 2301949 A | 12/1996 |
| GB | 2463483 A | 3/2010 |
| JP | 02106159 A | 4/1990 |
| JP | 06284504 A | 10/1994 |
| JP | 07-184361 A | 7/1995 |
| JP | 07337020 A | 12/1995 |
| JP | 11206183 A | 7/1999 |
| JP | 11307352 A | 11/1999 |
| JP | 2001-309683 A | 11/2001 |
| JP | 2004-289935 A | 10/2004 |
| JP | 2004289935 A | 10/2004 |
| JP | 2005-160284 A | 6/2005 |
| JP | 2005160284 A | 6/2005 |
| JP | 2005199986 A | 7/2005 |
| JP | 2006042529 A | 2/2006 |
| JP | 2006121877 A | 5/2006 |
| JP | 2006180675 A | 7/2006 |
| JP | 06-284504 A | 8/2006 |
| JP | 2006-217743 A | 8/2006 |
| JP | 2006217743 A | 8/2006 |
| JP | 2006-320134 A | 11/2006 |
| JP | 2006320134 A | 11/2006 |
| JP | 2007116840 A | 5/2007 |
| JP | 2007166900 A | 6/2007 |
| JP | 2008017682 A | 1/2008 |
| JP | 2008-29115 A | 2/2008 |
| JP | 2008029115 A | 2/2008 |
| JP | 2008061414 A | 3/2008 |
| JP | 2008189249 A | 8/2008 |
| JP | 2009-050059 A | 3/2009 |
| JP | 2010068641 A | 3/2010 |
| JP | 2010074869 A | 4/2010 |
| JP | 2010130837 A | 6/2010 |
| JP | 2010239823 A | 10/2010 |
| JP | 2008-17682 A | 1/2017 |
| WO | 2010122404 A1 | 10/2010 |

OTHER PUBLICATIONS

Matocha et al., "Getting the Most from SiC MOSFETs: Optimizing Conduction and Switching Losses for High Performance Power Electronics Applications," ISDRS 2009, Dec. 9-11, 2009, College Park, MD, pp. 1-2, http://www.ece.umd.edu/ISDRS2009.

Stevanovic et al. "Recent Advances in Silicon Carbide MOSFET Power Devices," Applied Power Elect Conference 2010, pp. 401-407.

Matocha et al., "1400 Volt, 5 milli-ohms-cm2 SiC MOSFETs for High-Speed Switching," Proceedings of the 22nd International Symposium on Power Semiconductor Devices & ICs, Hiroshima, pp. 365-368.

Matocha et al., "Performance and Reliability of SiC MOSFETs for High-Current Power Modules," ICSCRM 2009, pp. 1-4.

Stum et al., "4kV Silicon Carbide MOSFETs," The 8th European Conference on Silicon Carbide and Related Materials, Oslo, Norway, Aug. 29-Sep. 2, 2010, pp. 1-4.

(56) References Cited

OTHER PUBLICATIONS

Gurfinkel et al., "Time-Dependent Dielectric Breakdown of 4H-SiC/SiO2 MOS Capacitors," IEEE Transactions on Device and Materials Reliability, vol. 8, No. 4, Dec. 2008, pp. 635-641.
Stum et al., "300° C. Silicon Carbide Integrated Circuits," The 8th European Conference on Silicon Carbide and Related Materials, Oslo, Norway, Aug. 29-Sep. 2, 2010, pp. 1-4.
Tilak et al., "Electron-Scattering Mechanisms in Heavily Doped Silicon Carbide MOSFET Inversion Layers," IEEE Transactions on Electron Devices, vol. 54, No. 11, Nov. 2007, pp. 2823-2829.
Losee et al., "DC and Transient Performance of 4H-SiC Double-Implant MOSFETs," IEEE Transactions on Electron Devices, vol. 55, No. 8, Aug. 2008, pp. 1824-1829.
Matocha et al., "Time-Dependent Dielectric Breakdown of 4H-SiC Mos Capacitors and DMOSFETs," IEEE Transactions on Electron Devices, vol. 55, No. 8, Aug. 2008, pp. 1830-1834.
Matocha, "Challenges in SiC Power MOSFET Design," Solid-State Electronics, vol. 52, 2008, pp. 1631-1635, journal homepage: www.elsevier.com/locate/sse.
Elasser et al., "3kV 4H-SiC Thyristors for Pulsed Power Applications," Abstract, Materials Science Forum, vols. 645-648, 2010, pp. 1053-1056.
Losee et al., "100 Amp, 1000 Volt Class 4H-Silicon Carbide Mosfet Modules," Abstract, Materials Science Forum, vols. 615-617, 2009, pp. 899-903.
Matocha et al., "Understanding the inversion-layer properties of the 4H-SiC/SiO2 interface," The 8th European Conference on Silicon Carbide and Related Materials, Oslo, Norway, Aug. 29-Sep. 2, 2010, pp. 1-8.
EP Search Report and Opinion dated Apr. 26, 2012 from corresponding EP Application No. 11189255.0.
EP Search Report and Opinion dated Aug. 21, 2012 from corresponding EP Application No. 11189253.5.
Chinese Search Report issued in connection with CN Application No. 201110385885.8, dated Dec. 5, 2014.
EP Search Report and Opinion dated May 3, 2012 from corresponding EP Application No. 11189127.1.
Japanese Office Action issued in connection with corresponding JP Application No. 2011-248140 dated Dec. 22, 2015.
Shah, Hiren, "Designing small efficient ac/dc switching power supplies" EDN, vol. 56, Sep. 27, 2007.
Zhange, et al., "SIC's potential impact on design of wind generation system", IEEE, pp. 2231-2235, 2008.
El-Refaie, et al., "Comparison of Synchronous PM Machine Types for Wide Constant Power Speed Operation", Fourtieth IAS Annual Meeting. Conference Record of the 2005 Industry Applications Conference, 2005, vol. 2, pp. 1015-1022, Oct. 2005.
Horrdin et al. "Technology shifts in power electronics and electric motors for hybrid electric vehicles" Elektroteknikprogrammet 180p, Dept of Energy & Environment, Division of Electric Power Engineering, Chalmers University of Technology, Goteborg, Sweden, 2007.

Chinese Office Action issued in connection with corresponding CN Application No. 201110457014.6 dated Jan. 7, 2015.
Japanese Office Action issued in connection with corresponding JP Application No. 2011-248140 dated Aug. 2, 2016.
Unofficial English translation of Office Action issued in connection with corresponding JP Application No. 2011248140 dated Aug. 2, 2016.
Unofficial English translation of Search Report issued in connection with corresponding JP Application No. 2011248140 dated Dec. 16, 2015.
U.S. Appl. No. 12/949,862, filed Nov. 19, 2010, Ayman Mohamed Fawzi El-Refaie et al.
U.S. Appl. No. 12/949,882, filed Nov. 19, 2010, Ayman Mohamed Fawzi El-Refaie et al.
Unofficial English Translation of Japanese Search Report issued in connection with Related JP Application No. 2011250219 dated Dec. 10, 2015.
Unofficial English Translation of Japanese Office Action issued in connection with Related JP Application No. 2011250220 dated Dec. 15, 2015.
Unofficial English Translation of Japanese Office Action issued in connection with Related JP Application No. 2011250219 dated Jan. 5, 2016.
Unofficial English Translation of Chinese Office Action issued in connection with Related CN Application No. 201110385851.9 dated Jul. 26, 2016.
European Office Action issued in connection with Related EP Application No. 11189253.5 dated Aug. 19, 2016.
Unofficial English Translation of Japanese Office Action issued in connection with Related JP Application No. 2011250220 dated Nov. 22, 2016.
Unofficial English Translation of Japanese Office Action issued in connection with Related JP Application No. 2011250219 dated Dec. 13, 2016.
El-Refaie et al., "Comparison of Synchronous PM Machine Types for Wide Constant-Power Speed Range Operation", Conference Record—IAS Annual Meeting (IEEE Industry Applications Society), pp. 1015-1022, 2005.
Horrdin et al., "Technology Shifts in Power Electronics and Electric Motors for Hybrid Electric Vechicles", Master of Science Thesis, Chalmers University of Technology, pp. 1-69, 2007.
Shah, "Designing Small Efficient AC/DC Switching Power Supplies", EDN Network, vol. No. 56, pp. 53-56, Sep. 27, 2007.
Zhang et al., "SiC's Potential Impact on the Design of Wind Generation System", In Proceedings IEEE Ind.Electron. Conf, pp. 2231-2235, 2008.
Unofficial English Translation of Japanese Office Action issued in connection with Related JP Application No. 2011248140 dated Dec. 22, 2015.
Unofficial English Translation of Japanese Office Action issued in connection with Related JP Application No. 2011248140 dated Aug. 2, 2016.

* cited by examiner

HIGH POWER-DENSITY, HIGH BACK EMF PERMANENT MAGNET MACHINE AND METHOD OF MAKING SAME

BACKGROUND OF THE INVENTION

Embodiments of the invention relate generally to permanent magnet machines having high power-density and, more particularly, to a method and system for preventing fault conditions in a high power-density, high back electromotive force (emf) permanent magnet machines by providing power converters that include silicon carbide metal-oxide-semiconductor field effect transistors (MOSFETs).

The need for high power density and high efficiency electric machines (i.e., electric motors and generators) has long been prevalent for a variety of applications, particularly for hybrid and/or electric vehicle fraction applications. Due to energy supply and environmental reasons, there has been increased motivation to produce hybrid-electric and/or electric vehicles that are both highly efficient and reliable, yet reasonably priced for the average consumer. However, the drive motor technology available for hybrid-electric and electric vehicles has generally been cost-prohibitive, thereby reducing one (or both) of consumer affordability or manufacturer profitability.

Most commercially available hybrid-electric and electric vehicles rely on internal permanent magnet (IPM) electric machines for traction applications, as IPM machines have been found to have high power density and high efficiency over a wide speed range, and are also easily packaged in front-wheel-drive vehicles. However, in order to obtain such high power density, IPM machines must use expensive sintered high energy-product magnets. Furthermore, IPM machines run at high speed (e.g., 14,000 rpm) to obtain optimum power density. The power density of a permanent magnet machine is defined as the ratio of the power output and the volume of the permanent magnet machine. A relatively high power density (e.g., high power output relative to volume) is typically desirable. The high power density allows the permanent magnet machine to have either a smaller overall size for a given power output or a higher output for a given size.

As the speed of the rotor of the permanent magnet machine increases, the voltage developed in the stator (referred to as the "back emf") increases. This, in turn, requires that higher and higher terminal voltages be applied to produce the desired torque. The machine back emf is proportional to speed for a permanent magnet machine. If the peak line-to-line back emf at maximum speed is higher than the DC link voltage, and if control over the power converter is lost, the permanent magnet machine will start operating in an uncontrolled generation (UCG) mode. UCG occurs when the control gate signals to all of the six inverter switches are turned off, or disconnected. During this condition, the motor is connected to the DC source via the anti-parallel diodes of the inverter switches. The anti-parallel diodes create a potential path for current to flow, which is dependent upon the motor operating condition and DC source voltage. In this case, the permanent magnet machine will act as a generator converting rotational power into electric currents and will start dumping energy into the DC link through the anti-parallel diodes in the power converter, causing an increase in the DC link voltage. If this energy is not dissipated, or if the build-up of the DC link voltage is not limited, the voltage rating of the active devices in the power converter may be exceeded by the DC link voltage.

In order to minimize or prevent occurrences of the UCG mode of operation, a limit is typically set on the machine back emf or an additional clamping or crowbar circuit is added in parallel to the DC link. However, limiting the machine back emf reduces the power or torque density and speed capacity of the machine. Further, adding a crowbar circuit adds additional cost and complexity to the circuitry of the permanent magnet machine drive system. The back emf of a machine can also be reduced by limiting the amount or relative strength of the magnets in the machine, which also negatively impacts the power or torque density.

It would therefore be desirable to eliminate setting a machine back emf limit and/or to eliminate adding a crowbar circuit such that device voltage ratings are not exceeded during a UCG mode of operation.

BRIEF DESCRIPTION OF THE INVENTION

In accordance with one aspect of the invention, an electric drive system includes a permanent magnet machine having a rotor and a stator and a power converter electrically coupled to the permanent magnet machine and configured to convert a DC link voltage to an AC output voltage to drive the permanent magnet machine. The power converter includes a plurality of SiC switching devices having a voltage rating that exceeds a peak line-to-line back emf of the permanent magnet machine at a maximum speed of the permanent magnet machine.

In accordance with another aspect of the invention, a method of manufacturing an electric drive system includes the step of providing a SiC power converter that has a plurality of SiC switching devices and is coupleable to a power source. The method also includes the steps of providing a permanent magnet machine having a peak line-to-line back emf at maximum speed that is greater than a DC link voltage of the power source and coupling the SiC power converter to the permanent magnet machine to drive the permanent magnet machine.

In accordance with another aspect of the invention, a vehicle drive system includes a motor that has a permanent magnet rotor and a stator. The drive system also includes a DC link and a power converter electrically coupled between the DC link and the permanent magnet motor to drive the permanent magnet motor. The power converter comprises a plurality of SiC switching devices rated for a higher operating voltage than a maximum back emf capable of being developed in the stator of the permanent magnet motor.

Various other features and advantages will be made apparent from the following detailed description and the drawings.

BRIEF DESCRIPTION OF THE DRAWINGS

The drawings illustrate embodiments presently contemplated for carrying out the invention.

In the drawings.

DETAILED DESCRIPTION

Figure 1:
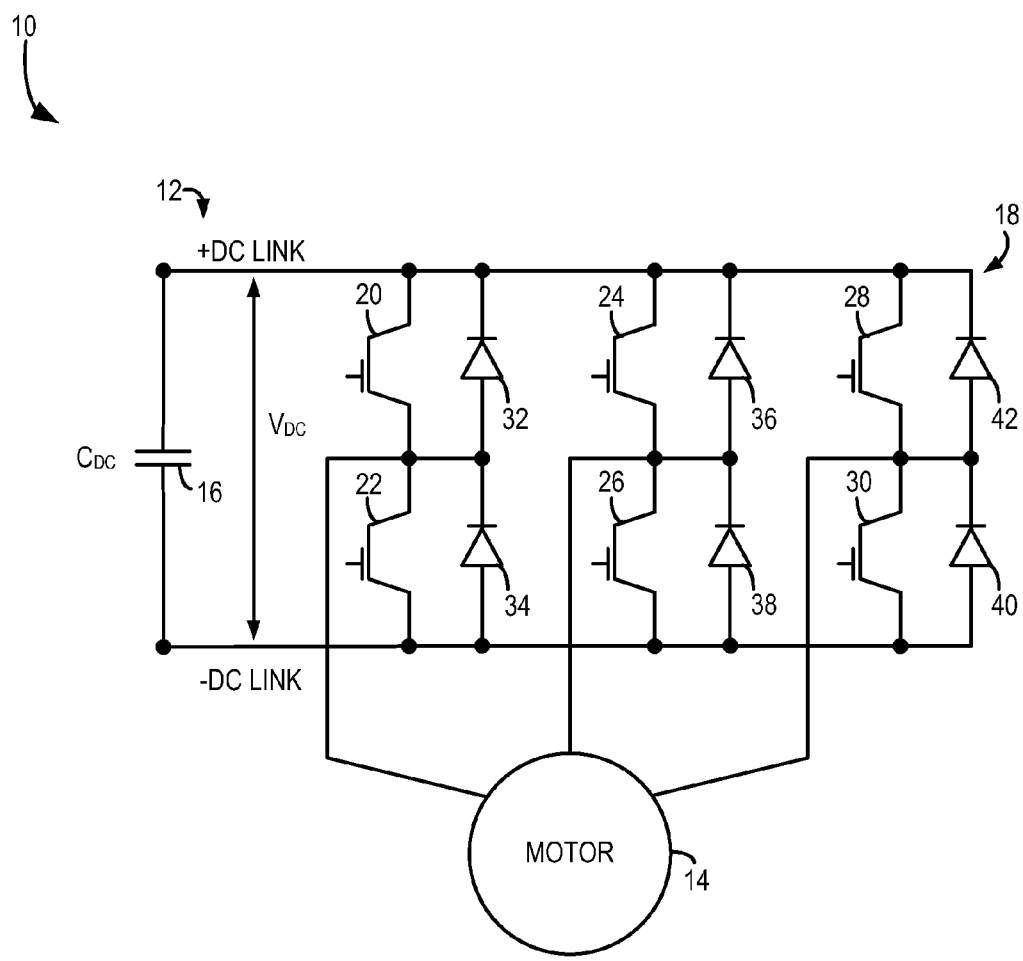
FIG. 1 illustrates a conventional permanent magnet machine drive system.

FIG. 1 illustrates a conventional three-phase permanent magnet machine drive system 10. System 10 includes a DC link 12 that provides a DC input voltage that is converted or inverted to an AC waveform that powers a permanent magnet machine 14. An input filter capacitor 16 is coupled across the DC link 12 for filtering the voltage $V_{DC}$ on the DC link 12. A power converter 18 receives the input voltage from DC link 12 when power flows from the DC link 12 to the AC permanent magnet machine 14. This direction of power flow is often referred to operating in a "motoring" mode. When the direction of power flow is from the permanent magnet machine 14 to the power converter 18, the input voltage to the power converter 18 is AC from the permanent magnet machine 14, while the output from the power converter 18 is a DC voltage on the DC link 12. Operation with power flow from the AC permanent magnet machine 14 to the power converter 18 is often referred to operation in a regenerative braking mode that is useful, for example, in a vehicle where it is desirable to hold a given value of speed on a downhill grade, or while decelerating the vehicle.

Power converter 18 is a typical 3-phase inverter having two series-connected switching devices per phase leg. For example, devices 20 and 22 form a first phase leg, devices 24 and 26 form a second phase leg, and devices 28 and 30 form a third phase leg. Devices 20-30 are conventional silicon semiconductor switching devices such as, for example, silicon IGBT, MOSFET, silicon bi-polar Darlington power transistor, GTO, SCR, or IGCT type devices. Diodes 32, 34, 36, 38, 40, 42 are coupled in anti-parallel relationship across respective silicon switching devices 20-30.

Figure 2:
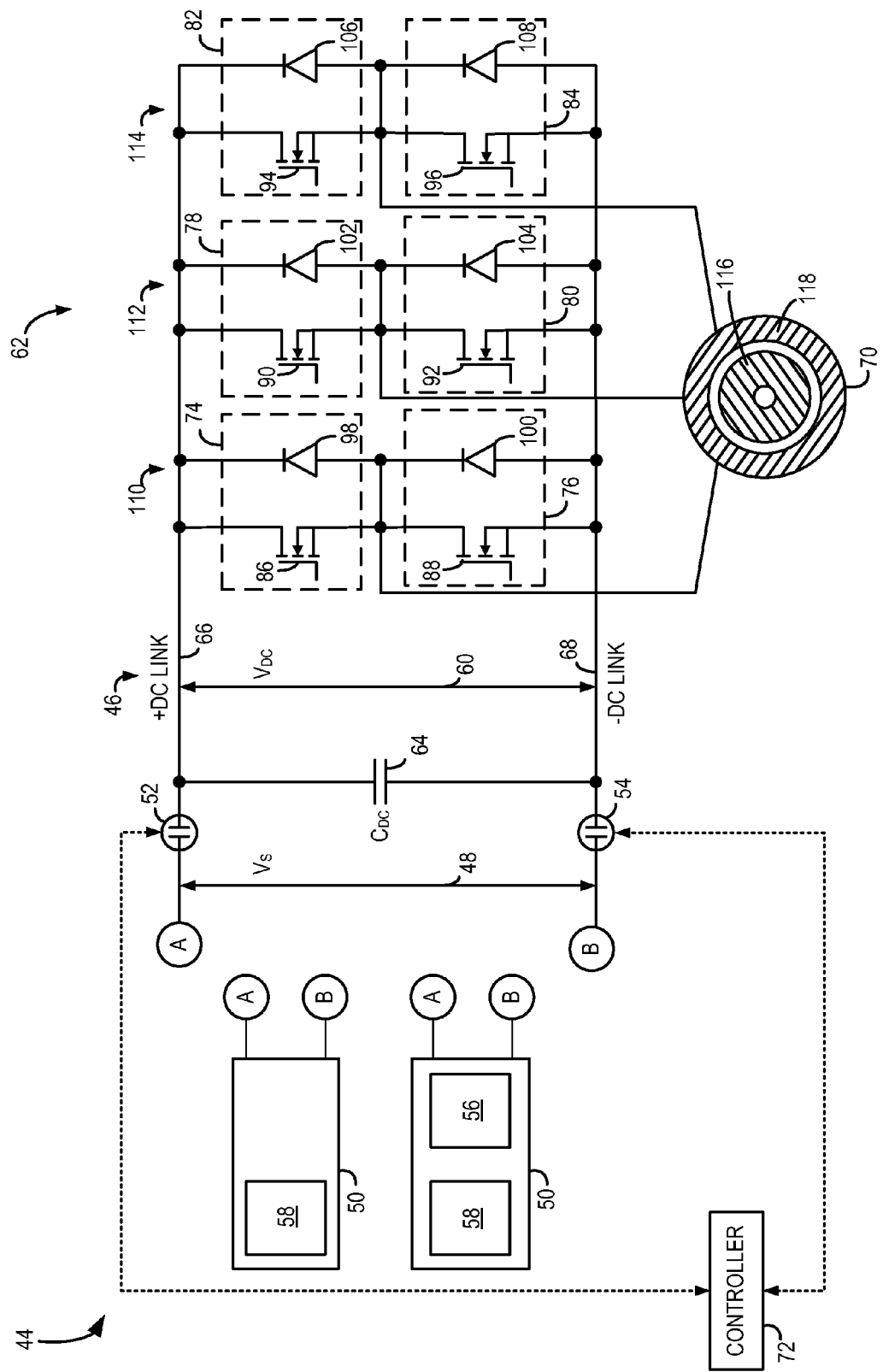
FIG. 2 illustrates a high-power density permanent magnet machine drive system, according to an embodiment of the invention.

FIG. 2 illustrates a permanent magnet machine drive system 44 in accordance with an embodiment of the invention. Drive system 44 includes a DC link 46 having a DC source voltage $V_S$ 48. Drive system 44 includes a power source 50 that provides DC source voltage $V_S$ 48. Drive system 44 includes preferably two contactors (C1, C2) 52, 54, or at least one contactor C1 to couple or disconnect DC link 46 from power source 50. In one embodiment, power source 50 includes an AC source 58 and a rectifier 56 configured to convert a voltage of AC source 58 to the DC link or source voltage $V_s$. In another embodiment, power source 50 includes a DC power source 58, such as a battery, a fuel cell, or a flywheel with associated power electronic converter. In yet another embodiment, power source 50 includes a DC power source 58, such as a battery, a fuel cell, an ultracapacitor, or a flywheel with an associated power electronic control coupled to a bi-directional DC-to-DC voltage converter 56 that boosts the source voltage to the DC link or source voltage $V_s$. DC link 46 supplies a DC output voltage $V_{DC}$ 60 to a power converter or inverter 62. An input filter capacitor 64 is illustrated between a positive DC rail 66 and a negative DC rail 68 and serves to provide a filter function for the high frequency currents from source 50 to ensure the power quality between positive and negative rails 66, 68.

Power converter 62 receives DC input voltage $V_{DC}$ 60 from DC link 46 and converts the DC input voltage to provide a suitable form of AC power for driving a permanent magnet machine 70, described in detail below. A controller 72 is also included in drive system 44 and includes means to open and close contactors C1 and C2 52, 54 based on sensed voltage inputs from $V_s$ 48, $V_{DC}$ 60, speed sensor inputs from machine 70, plus operator inputs as well as detected faults that may occur in power converter 62. Controller 72 also includes means to control the boost power command to the bi-directional boost converter 56.

According to one embodiment, power converter 62 is a three-phase DC to AC inverter having a plurality of switching devices 74, 76, 78, 80, 82, 84. Each switching device 74-84 includes a silicon carbide (SiC) MOSFETs 86, 88, 90, 92, 94, 96 and an associated anti-parallel diode 98, 100, 102, 104, 106, 108.

SiC is a crystalline substance that has material properties that make it an attractive alternative to silicon for high voltage, and high power applications. For example, SiC has a large bandgap that provides a very low leakage current, which facilitates elevated temperature operation. In fact, semiconductor devices manufactured on a SiC substrate can withstand temperatures in excess of 200 degrees C. SiC also has a high breakdown field that is about ten times that of silicon and a thermal conductivity that is about three times that of silicon, allowing higher power densities to be accommodated with SiC circuits. Further, SiC's high electron mobility enables high-speed switching. Thus, SiC has been considered as an advantageous material for use in the manufacture of next generation power semiconductor devices. Such devices include, for example, Schottky diodes, thyristors, and MOSFETs.

Moving from left to right in FIG. 2, switching devices 74, 76 are associated with a first output phase 110, switching devices 78, 80 are associated with a second output phase 112, and switching devices 82, 84 are associated with a third output phase 114. While a three-phase power converter and three-phase permanent magnet machine 70 are illustrated in FIG. 2, one skilled in the art will understand that embodiments of the present invention are equally applicable to a single-phase or other multi-phase embodiments. For example, alternate embodiments include configurations with varying number of phases, e.g., n-phase, where n=1, 2, 4, 5, 7, or higher number, where each phase of the power converter includes a plurality of switching devices similar to devices 86, 88, each with associated anti-parallel diodes similar to diodes 98, 100.

Power converter 62 drives a permanent magnet machine 70. In one embodiment, permanent magnet machine 70 is a traction motor that includes a permanent magnet rotor 116 and a stator 118, such as, for example, a fraction motor for powering an electric vehicle. Permanent magnet rotor permanent magnet rotor 116, may be configured as a surface mount, interior, or buried permanent magnet rotor, according to various embodiments. In an alternate embodiment, permanent magnet machine 70 is an alternator that includes a permanent magnet rotor 116 and a stator 118, such as, for example, a permanent magnet alternator coupled to a heat engine within an Auxiliary Power Unit (APU) for generating electrical power to aid in the operation of a hybrid-electric vehicle (HEV) or a Plug-in Hybrid-Electric Vehicle (PHEV).

The high voltage rating of SiC MOSFETs 86-96 allows permanent magnet machine 70 to be designed with a high back emf without having to worry about the uncontrolled generation mode, thereby significantly increasing the power density of permanent magnet machine 70. That is, SiC MOSFETs 86-96 have a voltage rating that exceeds the DC link voltage during an uncontrolled generation mode of permanent magnet machine 70. Conventional Si IGBT power modules used power converter circuits in commercially available on-road EV, HEV, and PHEV typically have a voltage rating of approximately 600 V or 1,200 V for some larger or high performance vehicles, including SUV's, trucks, and buses. According to one embodiment, SiC MOSFETs 86-96 are high voltage SiC MOSFETs manufactured by General Electric Company having a voltage rating of approximately three to four kV. The combined high voltage SiC power converter 62 combined with high power density multi-phase permanent magnet machine 70, allows upwards of two-to-four times power density with a substantial improvement in fault tolerance during periods of loss of control over the power converter 62 or loss of gate drive to the power modules within the power converter 62. Because SiC MOSFETs 86-96 can be manufactured to be physically smaller than conventional silicon MOSFETs, SiC MOSFETs 86-96 can be packaged in an automotive environment and can be operated at higher temperatures.

Excessive emf voltage of permanent magnet machine 70 may damage DC power source 58 of power source 50. Accordingly, in one embodiment, controller 72 is configured to detect a fault in power converter 62 and the associated gate drive circuitry of power converter 62. For example, a fault may be detected if the line-to-line back emf is within a threshold percentage of the voltage rating of DC power source 58. If a fault is detected, controller 72 may be programmed to disconnect or decouple DC power source 58 from power converter 62. Accordingly, excessive emf voltage created by permanent magnet machine 70 during a fault condition within power converter 62 will not result in overvoltage damage to DC power source 58. The high voltage rating of SiC power converter 62 and its associated components 86-96 will withstand the back emf from the high-power permanent magnet machine 70, even if a potential fault occurs while machine 70 is operating at high speed.

Therefore, according to one embodiment of the invention, an electric drive system includes a permanent magnet machine having a rotor and a stator and a power converter electrically coupled to the permanent magnet machine and configured to convert a DC link voltage to an AC output voltage to drive the permanent magnet machine. The power converter includes a plurality of SiC switching devices having a voltage rating that exceeds a peak line-to-line back emf of the permanent magnet machine at a maximum speed of the permanent magnet machine.

According to another embodiment of the invention, a method of manufacturing an electric drive system includes the step of providing a SiC power converter that has a plurality of SiC switching devices and is coupleable to a power source. The method also includes the steps of providing a permanent magnet machine having a peak line-to-line back emf at maximum speed that is greater than a DC link voltage of the power source and coupling the SiC power converter to the permanent magnet machine to drive the permanent magnet machine.

According to yet another embodiment of the invention, a vehicle drive system includes a motor that has a permanent magnet rotor and a stator. The drive system also includes a DC link and a power converter electrically coupled between the DC link and the permanent magnet motor to drive the permanent magnet motor. The power converter comprises a plurality of SiC switching devices rated for a higher operating voltage than a maximum back emf capable of being developed in the stator of the permanent magnet motor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:
1. An electric drive system comprising:
a permanent magnet machine having a rotor and a stator; and
a power converter electrically coupled between a DC link and the permanent magnet machine and configured to convert a DC link voltage to an AC output voltage to drive the permanent magnet machine, the power converter comprising:
a plurality of silicon carbide (SiC) three-terminal controlled switching devices having a voltage rating that exceeds a peak line-to-line back electromotive force (emf) of the permanent magnet machine at a maximum speed of the permanent magnet machine during an uncontrollable generation mode of the permanent magnet machine when a control gate signal on each of the switching devices are turned off.

2. The electric drive system of claim 1 wherein the plurality of SiC switching devices comprise a plurality of SiC metal-oxide-semiconductor field effect transistors (MOSFETs).

3. The electric drive system of claim 1 wherein a maximum DC link voltage of the electric drive system is less than the voltage rating of the plurality of SiC switching devices.

4. The electric drive system of claim 3 wherein the plurality of SiC switching devices have a voltage rating greater than approximately three kV.

5. The electric drive system of claim 1 wherein the permanent magnet machine comprises a multi-phase traction motor comprising one of 3, 5, 7, and 9 phases.

6. The electric drive system of claim 1 wherein the permanent magnet machine comprises a single-phase traction motor.

7. The electric drive system of claim 1 wherein the permanent magnet machine comprises a multi-phase alternator coupled to a heat engine.

8. The electric drive system of claim 1 wherein the power converter further comprises plurality of diodes connected in an anti-parallel arrangement with the plurality of SiC switching devices.

9. The electric drive system of claim 1 wherein the power converter is a three-phase power converter.

10. A method of manufacturing an electric drive system comprising the steps of:
providing a permanent magnet machine having a rotor and a stator;
providing a power converter having a plurality of silicon carbide (SiC) three-terminal controlled switching devices each having a voltage rating that exceeds a peak line-to-line back electromotive force (emf) of the permanent magnet machine at a maximum speed of the permanent magnet machine during an uncontrollable generation mode of the permanent magnet machine when a control gate signal on each of the switching devices are turned off; and
coupling the SiC power converter to the permanent magnet machine to drive the permanent magnet machine.

11. The method of manufacturing of claim 10 wherein the plurality of SiC switching devices comprise a plurality of SiC metal-oxide-semiconductor field effect transistors (MOSFETs).

12. The method of manufacturing of claim 10 further comprising coupling the power converter to a power source.

13. A vehicle drive system comprising:
a motor comprising:
a permanent magnet rotor; and
a stator;
a DC link; and
a power converter electrically coupled between the DC link and the motor to drive the motor;

wherein the power converter comprises a plurality of silicon carbide (SiC) three-terminal controlled switching devices having a voltage rating that exceeds a peak line-to-line back electromotive force (emf) of the motor at a maximum speed of the motor based on a fault condition when a control gate signal on each of the switching devices are turned off.

14. The vehicle drive system of claim 13 wherein the plurality of SiC switching devices comprise a plurality of SiC metal-oxide-semiconductor field effect transistors (MOSFETs).

15. The vehicle drive system of claim 13 wherein the plurality of SiC switching devices have a voltage rating of at least three kV.

16. The vehicle drive system of claim 13 wherein the power converter comprises a three-phase power converter.

17. The vehicle drive system of claim 13 further comprising a voltage source coupled to the DC link and configured to provide a source voltage to the DC link.

18. The vehicle drive system of claim 17 further comprising a controller electrically coupled to the power converter, the controller configured to detect a fault in the power converter when the peak line-to-line emf of the motor is within a threshold percentage of a voltage rating of the power source.

19. The vehicle drive system of claim 17 further comprising at least one contactor electrically coupled to the controller to receive signals therefrom, the at least one contactor connected between the power source and the power converter and configured to decouple the power source from the power converter upon receiving a fault signal from the controller.

20. The vehicle drive system of claim 17 wherein the voltage source comprises a DC source and a DC voltage converter configured to boost a voltage of the DC source to a DC link voltage.

21. The vehicle drive system of claim 20 wherein the DC source comprises at least one of a battery, an ultracapacitor, and a flywheel.

22. The vehicle drive system of claim 17 wherein the voltage source comprises an AC source and a rectifier configured to invert a voltage of the AC source to a DC link voltage.

23. The vehicle drive system of claim 13 wherein the motor comprises a multi-phase permanent magnet traction motor.

24. The vehicle drive system of claim 13 wherein the motor comprises a multi-phase permanent magnet alternator coupled to a heat engine of a hybrid electric vehicle.

* * * * *